US012254895B2

(12) United States Patent
Clark et al.

(10) Patent No.: US 12,254,895 B2
(45) Date of Patent: Mar. 18, 2025

(54) DETECTING AND COMPENSATING FOR THE PRESENCE OF A SPEAKER MASK IN A SPEECH SIGNAL

(71) Applicant: Digital Voice Systems, Inc., Westford, MA (US)

(72) Inventors: Thomas Clark, Westford, MA (US); John C. Hardwick, Acton, MA (US)

(73) Assignee: Digital Voice Systems, Inc., Westford, MA (US)

( * ) Notice: Subject to any disclaimer, the term of this patent is extended or adjusted under 35 U.S.C. 154(b) by 499 days.

(21) Appl. No.: 17/366,782

(22) Filed: Jul. 2, 2021

(65) Prior Publication Data

US 2023/0005498 A1 Jan. 5, 2023

(51) Int. Cl.

| | |
|---|---|
| ***G10L 21/00*** | (2013.01) |
| ***G10L 21/0272*** | (2013.01) |
| ***G10L 25/18*** | (2013.01) |
| ***G10L 25/78*** | (2013.01) |

(52) U.S. Cl.

CPC .......... *G10L 25/78* (2013.01); *G10L 21/0272* (2013.01); *G10L 25/18* (2013.01)

(58) Field of Classification Search

CPC ...... G10L 25/78; G10L 25/18; G10L 21/0272
See application file for complete search history.

(56) References Cited

U.S. PATENT DOCUMENTS

| | | | |
|---|---|---|---|
| 3,622,704 | A | 11/1971 | Ferrieu et al. |
| 3,903,366 | A | 9/1975 | Coulter |
| 4,358,737 | A | 11/1982 | Bennett |
| 4,484,354 | A | 11/1984 | Bennett et al. |
| 4,847,905 | A | 7/1989 | Lefevre et al. |
| 4,932,061 | A | 6/1990 | Kroon et al. |
| 4,944,013 | A | 7/1990 | Gouvianakis et al. |
| 5,081,681 | A | 1/1992 | Hardwick et al. |
| 5,086,475 | A | 2/1992 | Kutaragi et al. |
| 5,193,140 | A | 3/1993 | Minde |
| 5,195,166 | A | 3/1993 | Hardwick et al. |

(Continued)

FOREIGN PATENT DOCUMENTS

| | | |
|---|---|---|
| EP | 0893791 A2 | 1/1999 |
| EP | 1020848 A2 | 7/2000 |

(Continued)

OTHER PUBLICATIONS

Mears, J.C. Jr, "High-speed error correcting encoder/decoder," IBM Technical Disclosure Bulletin USA, vol. 23, No. 4, Oct. 1980, pp. 2135-2136.

(Continued)

*Primary Examiner* — Satwant K Singh
(74) *Attorney, Agent, or Firm* — Fish & Richardson P.C.

(57) ABSTRACT

Compensating a speech signal for the presence of a speaker mask includes receiving a speech signal, dividing the speech signal into subframes, generating speech parameters for a subframe, and determining whether the subframe is suitable for use in detecting a mask. If the subframe is suitable for use in detecting a mask, the speech parameters for the subframe are used in determining whether a mask is present. If a mask is present, the speech parameters for the subframe are modified to produce modified speech parameters that compensate for the presence of the mask.

23 Claims, 3 Drawing Sheets

(56) References Cited

U.S. PATENT DOCUMENTS

| | | | |
|---|---|---|---|
| 5,216,747 | A | 6/1993 | Hardwick et al. |
| 5,225,769 | A | 7/1993 | Fincke et al. |
| 5,226,084 | A | 7/1993 | Hardwick et al. |
| 5,226,108 | A | 7/1993 | Hardwick et al. |
| 5,247,579 | A | 9/1993 | Hardwick et al. |
| 5,275,158 | A | 1/1994 | Lopin |
| 5,351,338 | A | 9/1994 | Wigren et al. |
| 5,491,772 | A | 2/1996 | Hardwick et al. |
| 5,517,511 | A | 5/1996 | Hardwick et al. |
| 5,581,656 | A | 12/1996 | Hardwick et al. |
| 5,630,011 | A | 5/1997 | Lim et al. |
| 5,649,050 | A | 7/1997 | Hardwick et al. |
| 5,657,168 | A | 8/1997 | Maruyama et al. |
| 5,664,051 | A | 9/1997 | Hardwick et al. |
| 5,664,052 | A | 9/1997 | Nishiguchi et al. |
| 5,696,874 | A | 12/1997 | Taguchi |
| 5,701,390 | A | 12/1997 | Griffin et al. |
| 5,715,365 | A | 2/1998 | Griffin et al. |
| 5,742,930 | A | 4/1998 | Howitt |
| 5,754,974 | A | 5/1998 | Griffin et al. |
| 5,826,222 | A | 10/1998 | Griffin |
| 5,870,405 | A | 2/1999 | Hardwick |
| 5,937,376 | A | 8/1999 | Minde |
| 5,963,896 | A | 10/1999 | Ozawa |
| 6,018,706 | A | 1/2000 | Huang et al. |
| 6,058,194 | A | 5/2000 | Gulli et al. |
| 6,064,955 | A | 5/2000 | Huang et al. |
| 6,131,084 | A | 10/2000 | Hardwick |
| 6,161,089 | A | 12/2000 | Hardwick |
| 6,199,037 | B1 | 3/2001 | Hardwick |
| 6,377,916 | B1 | 4/2002 | Hardwick |
| 6,484,139 | B2 | 11/2002 | Yajima |
| 6,502,069 | B1 | 12/2002 | Grill et al. |
| 6,526,376 | B1 | 2/2003 | Villette et al. |
| 6,574,593 | B1 | 6/2003 | Gao et al. |
| 6,675,148 | B2 | 1/2004 | Hardwick |
| 6,816,741 | B2 | 11/2004 | Diab |
| 6,894,488 | B2 | 5/2005 | Kikugawa et al. |
| 6,895,373 | B2 | 5/2005 | Garcia et al. |
| 6,912,495 | B2 | 6/2005 | Griffin et al. |
| 6,931,373 | B1 | 8/2005 | Bhaskar et al. |
| 6,954,726 | B2 | 10/2005 | Brandel et al. |
| 6,963,833 | B1 | 11/2005 | Singhal |
| 7,016,831 | B2 | 3/2006 | Suzuki et al. |
| 7,026,810 | B2 | 4/2006 | Kikugawa et al. |
| 7,123,176 | B1 | 10/2006 | Jordanov |
| 7,139,701 | B2 | 11/2006 | Harton et al. |
| 7,155,388 | B2 | 12/2006 | Kushner et al. |
| 7,254,535 | B2 | 8/2007 | Kushner et al. |
| 7,289,952 | B2 | 10/2007 | Yasunaga et al. |
| 7,394,833 | B2 | 7/2008 | Heikkinen et al. |
| 7,421,388 | B2 | 9/2008 | Zinser et al. |
| 7,430,507 | B2 | 9/2008 | Zinser et al. |
| 7,519,530 | B2 | 4/2009 | Kaajas et al. |
| 7,529,660 | B2 | 5/2009 | Bessette et al. |
| 7,529,662 | B2 | 5/2009 | Zinser et al. |
| 7,617,099 | B2 | 11/2009 | Yang et al. |
| 7,693,712 | B2 | 4/2010 | Gaeta et al. |
| 7,809,559 | B2 | 10/2010 | Kushner et al. |
| 9,418,675 | B2 * | 8/2016 | Zhu ..................... G10L 21/0208 |
| 11,295,759 | B1 * | 4/2022 | Rothenberg ............ G10L 25/60 |
| 2003/0135374 | A1 | 7/2003 | Hardwick |
| 2004/0093206 | A1 | 5/2004 | Hardwick |
| 2004/0117178 | A1 | 6/2004 | Ozawa |
| 2004/0153316 | A1 | 8/2004 | Hardwick |
| 2005/0278169 | A1 * | 12/2005 | Hardwick ............. G10L 19/167 704/223 |
| 2010/0088089 | A1 | 4/2010 | Hardwick |
| 2010/0094620 | A1 | 4/2010 | Hardwick |
| 2010/0108065 | A1 | 5/2010 | Zimmerman et al. |
| 2017/0325049 | A1 | 11/2017 | Basu Mallick et al. |
| 2020/0077177 | A1 * | 3/2020 | Usher ...................... G01H 3/00 |
| 2021/0210106 | A1 | 7/2021 | Clark |
| 2022/0199109 | A1 * | 6/2022 | Exner ..................... G10L 25/51 |
| 2023/0186942 | A1 * | 6/2023 | Ostrand .................. G10L 25/18 704/200 |

FOREIGN PATENT DOCUMENTS

| | | | |
|---|---|---|---|
| EP | 1237284 | A1 | 9/2002 |
| JP | 05346797 | A | 12/1993 |
| JP | 10293600 | A | 11/1998 |
| WO | 1998004046 | A2 | 1/1998 |

OTHER PUBLICATIONS

Shoham. “High-quality speech coding at 2.4 to 4.0 kbit/s based on time-frequency Interpolation,” 1993 IEEE International Conference on Acoustics, Speech, and Signal Processing. vol. 2. IEEE, 1993. Apr. 30, 1993 (Apr. 30, 1993) Retrieved on Mar. 9, 2021 (Mar. 9, 2021) from <https://ieeexplorejeee.org/abstract/document/319260> entire document.

* cited by examiner

DETECTING AND COMPENSATING FOR THE PRESENCE OF A SPEAKER MASK IN A SPEECH SIGNAL

TECHNICAL FIELD

This description relates generally to the processing of speech.

BACKGROUND

Speech is generally considered to be a non-stationary signal having signal properties that change over time. These changes in signal properties are generally linked to changes made in the properties of a person's vocal tract to produce different sounds. A sound is typically sustained for some short period, such as 10-100 ms, and then the vocal tract is changed again to produce the next sound. The transition between sounds may be slow and continuous or it may be rapid as in the onset of speech.

A speech signal corresponding to recorded or transmitted speech may be processed to enhance the quality and intelligibility of the speech. This processing may be part of speech encoding, which is also known as speech compression, which seeks to reduce the data rate needed to represent a speech signal without substantially reducing the quality or intelligibility of the speech. Speech compression techniques may be implemented by a speech coder, which also may be referred to as a voice coder or vocoder.

A speech coder is generally viewed as including an encoder and a decoder. The encoder produces a compressed stream of bits from a digital representation of speech, such as may be generated at the output of an analog-to-digital converter having as an input an analog signal produced by a microphone. The decoder converts the compressed bit stream into a digital representation of speech that is suitable for playback through a digital-to-analog converter and a speaker. In many applications, the encoder and the decoder are physically separated, and the bit stream is transmitted between them using a communication channel.

A key parameter of a speech coder is the amount of compression the coder achieves, which is measured by the bit rate of the stream of bits produced by the encoder. The bit rate of the encoder is generally a function of the desired fidelity (i.e., speech quality) and the type of speech coder employed. Different types of speech coders have been designed to operate at different bit rates. For example, low to medium rate speech coders may be used in mobile communication applications. These applications typically require high quality speech and robustness to artifacts caused by acoustic noise and channel noise (e.g., bit errors).

One approach for low to medium rate speech coding is a model-based speech coder or vocoder. A vocoder models speech as the response of a system to excitation over short time intervals. Examples of vocoder systems include linear prediction vocoders such as MELP, homomorphic vocoders, channel vocoders, sinusoidal transform coders ("STC"), harmonic vocoders and multiband excitation ("MBE") vocoders. In these vocoders, speech is divided into short segments (typically 10-40 ms), with each segment being characterized by a set of model parameters. These parameters typically represent a few basic elements of each speech segment, such as the segment's pitch, voicing state, and spectral envelope. A vocoder may use one of a number of known representations for each of these parameters. For example, the pitch may be represented as a pitch period, a fundamental frequency or pitch frequency (which is the inverse of the pitch period), or a long-term prediction delay. Similarly, the voicing state may be represented by one or more voicing metrics, by a voicing probability measure, or by a set of voicing decisions. The spectral envelope may be represented by a set of spectral magnitudes or other spectral measurements. Since they permit a speech segment to be represented using only a small number of parameters, model-based speech coders, such as vocoders, typically are able to operate at medium to low data rates. However, the quality of a model-based system is dependent on the accuracy of the underlying model. Accordingly, a high fidelity model must be used if these speech coders are to achieve high speech quality.

An MBE vocoder is a harmonic vocoder based on the MBE speech model that has been shown to work well in many applications. The MBE vocoder combines a harmonic representation for voiced speech with a flexible, frequency-dependent voicing structure based on the MBE speech model. This allows the MBE vocoder to produce natural sounding unvoiced speech and makes the MBE vocoder robust to the presence of acoustic background noise. These properties allow the MBE vocoder to produce higher quality speech at low to medium data rates and have led to its use in a number of commercial mobile communication applications.

The MBE vocoder (like other vocoders) analyzes speech at fixed intervals, with typical intervals being 10 ms or 20 ms. The result of the MBE analysis is a set of MBE model parameters including a fundamental frequency, a set of voicing errors, a gain value, and a set of spectral magnitudes. The model parameters are then quantized at a fixed interval, such as 20 ms, to produce quantizer bits at the vocoder bit rate. At the decoder, the model parameters are reconstructed from the received bits. For example, model parameters may be reconstructed at 20 ms intervals, and then overlapping speech segments may be synthesized and added together at 10 ms intervals.

SUMMARY

Techniques are provided for detecting whether a speech signal has been "muffled" by a mask being worn by the person who spoke to produce the speech signal, and for boosting the speech to reverse the muffling caused by the mask, while limiting the boosting of background noise.

In one general aspect, compensating a speech signal for the presence of a speaker mask includes receiving a speech signal, dividing the speech signal into subframes, generating speech parameters for a subframe, and determining whether the subframe is suitable for use in detecting a mask. If the subframe is suitable for use in detecting a mask, the speech parameters for the subframe are used in determining whether a mask is present. If a mask is present, the speech parameters for the subframe are modified to produce modified speech parameters that compensate for the presence of the mask.

Implementations may include one or more of the following features. For example, the speech parameters for the subframe may include a speech spectrum and spectral band energies for multiple voice bands, and using the speech parameters for the subframe in determining whether a mask is present may include examining a spectral slope for a subset of the voice bands. For example, a subset of the voice bands in the frequency range from 750 Hz to 4000 Hz may be examined. Determining whether a mask is present may include comparing the spectral slope to a threshold value and determining that a mask is present when the spectral slope exceeds the threshold value. Determining whether a mask is present also may include updating an average spectral slope corresponding to multiple subframes using the speech parameters for the subframe and examining the updated average spectral slope for a subset of the voice bands.

Determining whether the subframe is suitable for use in detecting a mask also may include determining whether signal energy of the subframe exceeds a threshold value.

Modifying the speech parameters for the subframe to produce modified speech parameters that compensate for the presence of the mask may include boosting gains in a subset of voice bands affected by the presence of a mask. Boost levels may vary between voice bands in the subset of voice bands. For example, boost levels may be reduced for any voice bands in the subset of voice bands that do not include signal energy that exceeds noise energy by a threshold margin.

The speech parameters may be model parameters of a Multi-Band Excitation speech model.

In another general aspect, a communications device configured to compensate a speech signal for the presence of a speaker mask includes a microphone, a speech encoder that receives a speech signal from the microphone and generates digital speech parameters, and a transmitter that receives the digital speech parameters from the speech encoder and transmits the digital speech parameters. The speech encoder may be configured to divide the speech signal into subframes, generate speech parameters for a subframe, and determine whether the subframe is suitable for use in detecting a mask. If the subframe is suitable for use in detecting a mask, the speech encoder may use the speech parameters for the subframe in determining whether a mask is present. If a mask is present, the speech encoder may modify the speech parameters for the subframe to produce modified speech parameters that compensate for the presence of the mask and provide the modified speech parameters to the transmitter as the digital speech parameters.

Implementations may include one or more of the features discussed above.

In another general aspect, a speech encoder configured to compensate a speech signal for the presence of a speaker mask is configured to receive a speech signal, divide the speech signal into subframes, generate speech parameters for a subframe, and determine whether the subframe is suitable for use in detecting a mask. If the subframe is suitable for use in detecting a mask, the speech encoder may use the speech parameters for the subframe in determining whether a mask is present. If a mask is present, the speech encoder may modify the speech parameters for the subframe to produce modified speech parameters that compensate for the presence of the mask and provide the modified speech parameters to the transmitter as the digital speech parameters.

Implementations may include one or more of the features discussed above.

Other features will be apparent from the following description, including the drawings, and the claims.

DETAILED DESCRIPTION

Figure 1:
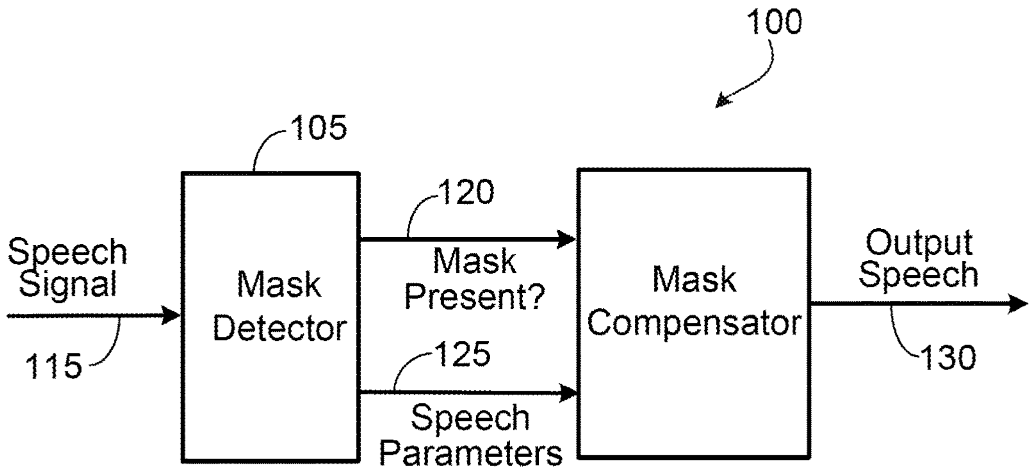
FIG. 1 is a block diagram of a speech processing system employing mask detection and compensation.

Referring to FIG. 1, a speech processing system 100 may be employed to detect the presence of a mask and to compensate for the mask to improve quality and intelligibility of a speech signal. The system 100 includes a mask detector 105 and a mask compensator 110. The mask detector 105 receives an analog or digital speech signal 115 and processes the speech signal 115 to determine whether the speaker who spoke the speech corresponding to the speech signal 115 was wearing a mask when doing so. The mask detector 105 provides the mask compensator 110 with an indication 120 of whether a mask is present and speech parameters 125 corresponding to the speech signal (which may include the speech signal itself).

The mask compensator 110 receives the indication 120 and speech parameters 125 and, when a mask is present, modifies the speech parameters 125 to account for the presence of the mask. The mask compensator then produces output speech 130 that has been modified to account for the presence of a mask. The output speech may include speech parameters, an analog or digital speech signal, or sound produced by a speaker within the mask compensator 110.

Figure 2:
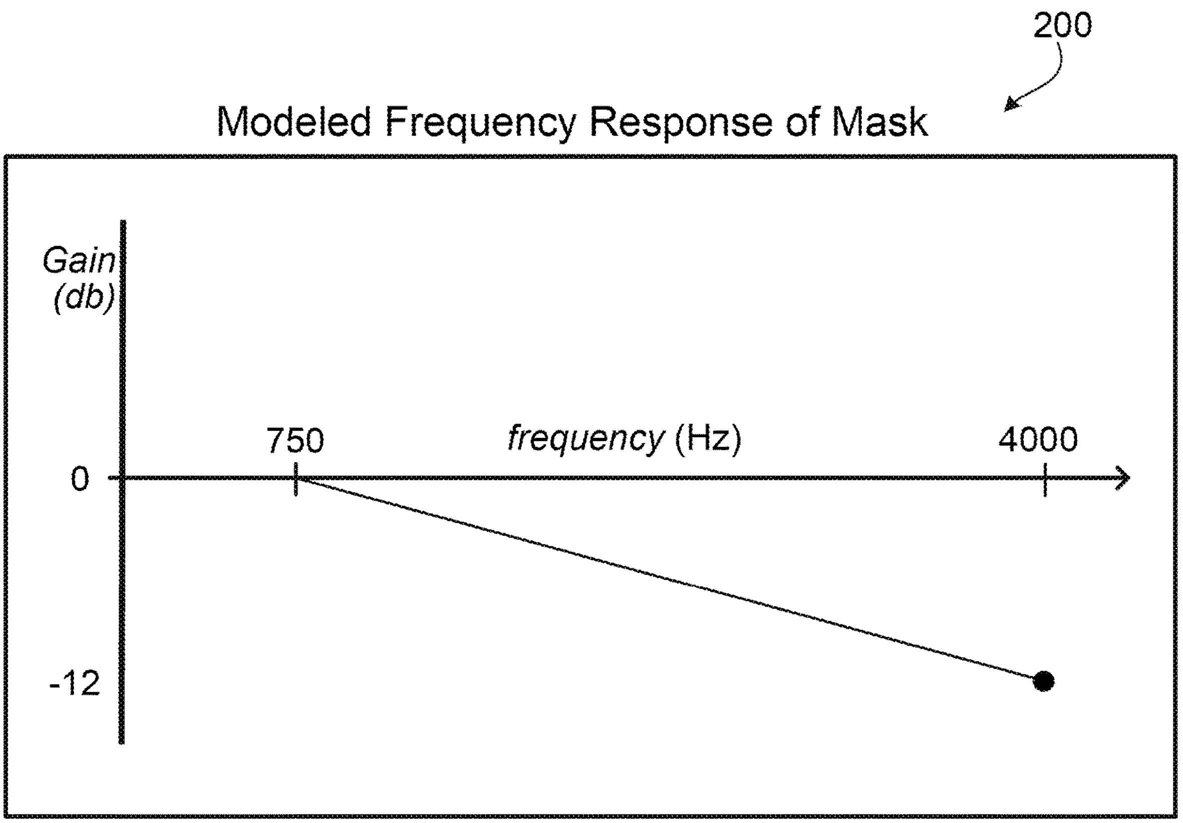
FIG. 2 is a graph of the frequency response of a cloth mask.

Wearing a mask while speaking has been observed to cause negative impact to the quality and intelligibility of speech, such as speech corresponding to the speech signal 115. The mask, whether it is a cloth mask or an N95 mask, acts like a filter. As shown in FIG. 2, the frequency response 200 of a speech signal is generally attenuated most at higher frequencies. The attenuation of speech in dB has been observed to be generally linear with frequency. At frequencies below 750 Hz, the attenuation is negligible, but the attenuation increases linearly to around 12 dB at 4 kHz for a typical cloth mask.

In one implementation, the mask detector 105 determines whether a mask is present by examining the spectral slope of the speech signal. When a mask is detected, the mask compensator 110 applies an inverse filter to correct for the mask by boosting impacted portions of the speech signal. This correction is complicated by the presence of background noise, as simply applying a static inverse filter to the signal would amplify the background noise as well as the signal. To account for noise, the mask compensator 110 dynamically weights the filter such that the mask correcting boost is eliminated when the signal is primarily noise. The mask compensator 110 also may apply the boost in frequency bands that contain primarily signal while not applying the boost in frequency bands that are dominated by noise.

Figure 3:
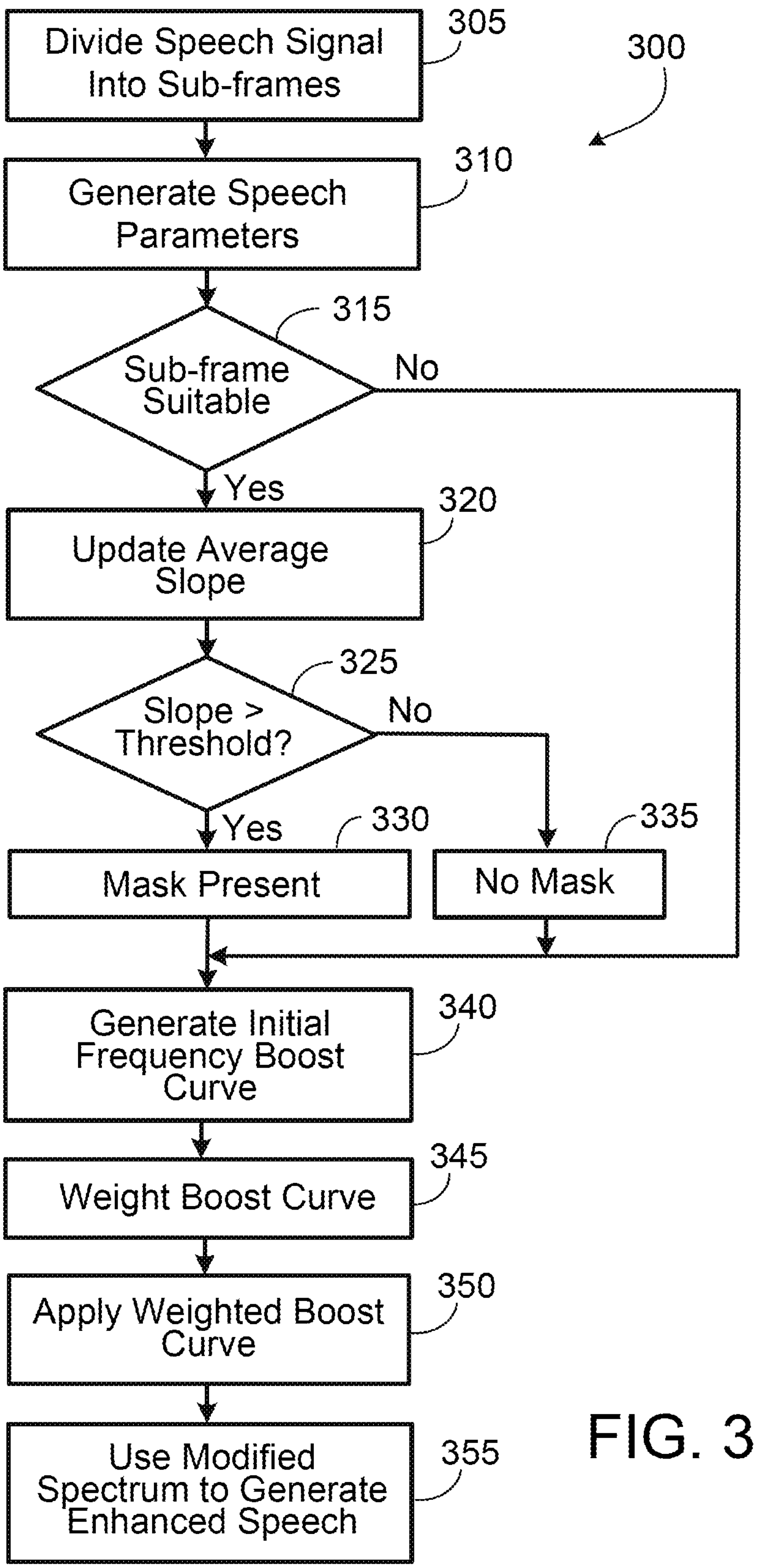
FIG. 3 is a flow chart showing operation of a speech processing system.

Referring to FIG. 3, the speech processing system 100 may operate according to a procedure 300. Initially, the speech signal 115 is divided into subframes (step 305). Each subframe corresponds to a 10 ms window of the speech signal 115 generated using a 25 ms hamming window.

Speech parameters then are generated for a subframe (step 310). This includes computing a 256-point DFT on the windowed speech corresponding to the subframe to produce a speech spectrum. The speech spectrum is used to calculate sixteen spectral band energies for bands that are each 250 Hz wide, where the mask detector 105 examines the spectral slope of voice bands in the spectrum between 750 Hz and 4000 Hz to determine whether a mask is present. The spectral band energies are used to estimate noise levels in the sixteen bands. The noise estimation is made by averaging the signal levels in each band over time and by tracking the minimum signal level observed in each band.

The mask detector 105 maintains a Boolean state variable that tracks whether a mask has been detected. The average gain and the average spectral slope over multiple subframes also computed and tracked. Certain subframes that are low in energy or have a slope that is too small are excluded from the average spectral slope calculation. Bands that are dominated by noise also are excluded from the slope calculation.

When a subframe is processed, the mask detector 105 determines whether the subframe is suitable for use in updating the average spectral slope (step 315). If the subframe is suitable, the mask detector 105 updates the average spectral slope (step 320) and compares the updated average to a threshold (step 325). If the average exceeds the threshold, a mask is determined to be present and the mask detector 105 updates the Boolean state variable to indicate that a mask is present (step 330). If the average does not exceed the threshold, no mask is determined to be present and the mask detector 105 updates the Boolean state variable to indicate that no mask is present (step 335).

The mask compensator 110 generates an initial frequency boost curve for the subframe (step 340). The mask compensator does so using the speech parameters for the subframe and the state variable indicating whether a mask is present. When a mask is present, the initial boost curve provides 12 dB of gain at 4 kHz and tapers linearly to 0 dB of gain at 750 Hz. When no mask is present, the boost is 0 dB for all frequencies. This initial boost curve would be the best filter to correct the signal if no background noise were present.

The mask compensator 110 then weights the boost curve to account for noise (step 345). This weighting is undertaken to prevent boosting of bands that are dominated by noise. For each band, the mask compensator 110 compares the signal level for the band to the noise level for the band. When the signal level exceeds the noise level by enough margin, the boost weighting for the band is set to 1.0 (full boost) for the current subframe and several subsequent subframes. When the signal level exceeds the noise level by another smaller margin, then the boost weighting for the band is set to 0.5 (half boost) for the current subframe and several subsequent subframes. Otherwise, the boost weighting for the band is set to 0.0 (no boost) to disable boosting for the band. As long as the presence or absence of a mask doesn't change, the weights are held for several subframes because it is not desirable to switch the dynamic weighting excessively. The overall effect is to reduce or eliminate the boost for bands where the signal-to-noise ratio is low.

The mask compensator 110 then applies the weighted boost curve to the spectrum (step 350). For example, the $\log_2$ boost curve may be converted to a linear scale at each DFT frequency and the DFT coefficients may be scaled accordingly. This eliminates or reduces the attenuation to the spectrum imposed by the mask without boosting the background noise. The resulting boosted spectrum then may be used to estimate the spectral magnitudes of each voice harmonic.

The modified spectrum then is used to generate enhanced output speech (step 355) before proceeding to the next subframe.

The speech processing system 100 may be operated independently to enhance a signal that is potentially degraded by a mask, or it may be incorporated into a speech coder, such as a AMBE vocoder that uses the spectrum to estimate the magnitudes for each voice harmonic. When mask detection and compensation is employed, this spectrum gets scaled to compensate for the mask. However, an inverse-DFT also may be applied to the spectrum to produce a modified spectrum that then is overlap-added with neighboring spectra to get a resulting compensated speech signal.

Figure 4:
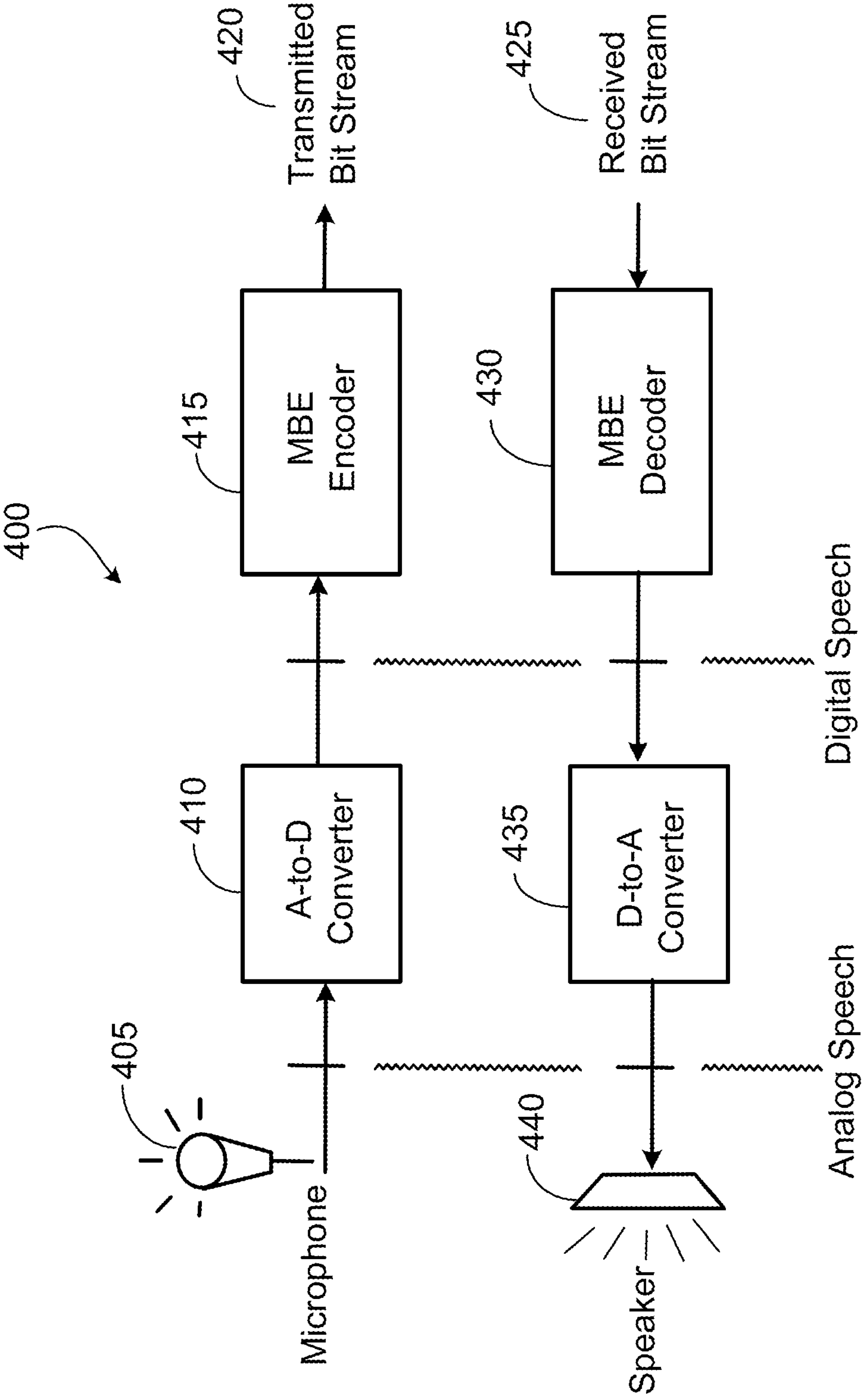
FIG. 4 is a block diagram of a communications device.

FIG. 4 shows a communications device 400 that samples analog speech or some other signal from a microphone 405. An analog-to-digital ("A-to-D") converter 410 digitizes the sampled speech to produce a digital speech signal. The digital speech is processed by a MBE speech encoder unit 415 to produce a digital bit stream 420 suitable for transmission by a transmitter or storage. The speech encoder processes each subframe of the digital speech signal to produce a corresponding frame of bits in the bit stream output of the encoder. This includes estimating generalized MBE model parameters for the subframe. The MBE model parameters include a fundamental frequency, a set of voicing errors, a gain value, and a set of spectral magnitudes.

FIG. 4 also depicts a received bit stream 425 entering a MBE speech decoder unit 430 that processes each frame of bits to produce a corresponding frame of synthesized speech samples. A digital-to-analog ("D-to-A") converter unit 435 then converts the digital speech samples to an analog signal that can be passed to a speaker unit 440 for conversion into an acoustic signal suitable for human listening.

A mask detector and a mask compensator, such as the mask detector 105 and the mask compensator 110, may be incorporated most efficiently in the MBE speech encoder unit 415, but may also be employed in the MBE speech decoder unit 430. And the mask detector and the mask compensator may be divided, with the mask detector being included in the MBE speech encoder unit 415 and the mask compensator being included in the MBE speech decoder unit 430. And some implementations may include only a mask compensator, with the presence of the mask being determined by other means, such as a camera or an indication by a user (e.g., by pressing a button).

The details of a particular implementation of the procedure 300 in an MBE vocoder are provided below.

Spectrum Measurement

The input to the process is an 8 kHz speech signal, s(n). However, the process can be adjusted to work for different sampling rates. For each subframe, the spectrum, $S_m(k)$, is measured from s(n) and stored for later use in estimating the MBE spectral amplitude model parameters. The spectrum is measured by first windowing s(n) and transforming the result into the frequency domain using DFT:

$$S_{w_m}(k) = \sum_{n=-127}^{127} w_m(n) s(n+127) e^{\frac{-j2\pi kn}{256}} \quad \text{for } 0 \le k < 128$$

Where $w_m(n)$ is a 25 ms hamming window defined as follows:

$$w_m(n) = \begin{cases} 0.54 + 0.46\cos\left[\frac{\pi}{100}n\right] & \text{for } -100 \le n < 100 \\ 0 & \text{otherwise} \end{cases}$$

The square magnitude of the result is stored as the spectrum measurement, $S_m(k)$ for the subframe:

$$S_m(k) = |S_{w_m}(k)|^2 \text{ for } 0 \le k < 128$$

Computation of Spectral Band Energies

The spectrum, $S_m(k)$, is used to compute the spectral energy in 16 frequency bands:

$$e_i = 0.5\log_2\left[\sum_{k=8i}^{8i+15} S_m(k)\right] - 7.0 \text{ for } 0 \le i < 16$$

Estimation of the Noise Spectrum

The spectral energies in each band are then used to update an estimate of the noise energy in each band. The following process is used:

```
if v_count < 8 then
  a_i^(0) ⇐ (v_count · a_i^(-1) + e_i)/(v_count + 1)
  m_i^(0) ⇐ 16.0
  c_i^(0) ⇐ 300
else if e_i < a_i^(-1) + 2 then
  if e_i < a_i^(-1) and e_i < 2 then
    a_i^(0) ⇐ 0.5 · a_i^(-1) + 0.5 · e_i
  else
    a_i^(0) ⇐ 0.9 · a_i^(-1) + 0.1 · e_i
  endif
  m_i^(0) ⇐ 16.0
  c_i^(0) ⇐ 300
else if c_i^(-1) > 0 then
  if e_i < m_i^(-1) - 2 then
    a_i^(0) ⇐ e_i
  else
    a_i^(0) ⇐ a_i^(-1)
    m_i^(0) ⇐ 0.9 · m_i^(-1) + 0.1 · e_i
  endif
  c_i^(0) ⇐ c_i^(-1) - 1
else
a_i^(0) ⇐ m_i^(-1)
m_i^(0) ⇐ 16.0
  c_i^(0) ⇐ 300
end if
```

The process updates three vectors. The vector $a_i$ for $0 \le i < 16$ stores the average noise level for each band. The vector $m_i$ for $0 \le i < 16$ tracks the minimum noise level for each band. The vector $c_i$ for $0 \le i < 16$ contains a 3 second counter for each band. Note that the process is designed to be called at 10 ms intervals such that 300 iterations of the process corresponds to 3 seconds. Generally, a speaker pauses to breathe more often than once every 3 seconds.

The initial conditions for each of the state variables above are as follows:

$$a_0 = 7.0, a_1 = 6.0, a_2 = 5.0, a_3 = 4.0, a_4 = 3.0, a_5 = 2.0$$

$$a_i = 1.0 \text{ where } 6 \le i < 16$$

$$m_i = 16.0 \text{ where } 0 \le i < 16$$

$$c_i = 16.0 \text{ where } 0 \le i < 16$$

$$V_{count} = 0$$

Note that, in the process above, the superscript notation, $v^{(0)}$, refers to the new value for variable v in the current subframe. Whereas, $v^{(-1)}$, refers to the prior value for variable v in the prior subframe.

Calculating the Dynamic Boost Weighting

The spectral band energies from the current subframe, $S_b(n)$, and the current estimate of noise spectrum, $a_i$, are used to compute a set of weights. Integer counters, $C_{FB}(n)$ for $0 \le n < 16$, are updated as follows:

$$C_{FB}(n) = \begin{cases} 5 & \text{when } S_b(n) > S_N(n) + 1.0 \\ \max[2, C_{FB}(n)] & \text{when } S_N(n) + 1.0 > S_b(n) > S_N(n) + 0.5 \\ \max[0, C_{FB}(n) - 1] & \text{otherwise} \end{cases}$$

When $C_{FB}(n) > 0$, for band n, the weight for that band will allow full boost. Additionally, integer counters, $C_{HB}(n)$ for $0 \le n < 16$, are updated as follows:

$$C_{HB}(n) = \begin{cases} 10 & \text{when } S_b(n) > S_N(n) + 1.0 \\ \max[4, C_{HB}(n)] & \text{when } S_N(n) + 1.0 > S_b(n) > S_N(n) + 0.5 \\ \max[0, C_{HB}(n) - 1] & \text{otherwise} \end{cases}$$

When $C_{FB}(n) > 0$, for band n, the weight for that band is 1.0, enabling full boost for that band. When $C_{HB}(n) > 0$, for band n, the weight for that band is 0.5, which will allow half boost for the band. Otherwise, the weight for the band is 0.0, which disables boost for the band.

$$w(n) = \begin{cases} 1.0 & \text{when } C_{FB}(n) > 0 \\ 0.5 & \text{when } C_{FB}(n) = 0 \text{ and } C_{HB}(n) > 0 \\ 0.0 & \text{otherwise} \end{cases}$$

Later, these weights will be applied to the boost filter. The weights can reduce or eliminate the boost in particular bands that are noisy.

Mask Detection

Mask detection uses the spectral band energies, $e_i$ for $0 \le i < 16$, and the average noise levels, $a_i$ for $0 \le i < 16$. Mask detection also uses three state variables: d is the detector state, $G_M$ is the maximum gain, and $M_A$ is the average slope. Variable d is a Boolean where 0 indicates that a mask has not been detected and 1 means that a mask has been detected. $d^{(-1)}$ refers to the value of variable d in the prior subframe, whereas $d^{(0)}$ (or simply d) refers to the value of variable d in the current subframe. The initial value for d is 0. Similarly, the superscripts $^{(-1)}$ and $^{(0)}$ can be used to refer to values of variables $G_M$ and $M_A$ in the prior and current subframes. The initial values are: $G_M = 0$ and $M_A = 9.0/16$.

As an initial step in mask detection, the noise cutoff band is determined. This is the lowest frequency band for which the signal energy does not exceed the noise energy by at least 3 dB.

$$\text{if } e_{i+1} - 0.5 < a_{i+1} \text{ then } C = i$$

If C<6, then this subframe does not have enough bands with voice and the mask detection process ends and returns the detection state of the prior subframe. If the mask detection process ends at this point, then state variables $G_M$ and $M_A$ are not updated.

$$\text{If } C < 6 \text{ then } \{d^{(0)} = d^{(-1)}, G_M^{(0)} = G_M^{(-1)}, M_A^{(0)} = M_A^{(-1)}\}$$

Next, a gain value is computed by computing the average spectral band energy in the lowest 6 frequency bands.

$$G = \frac{\sum_{i=0}^{5} e_i}{6}$$

Next, the maximum gain is updated as follows:

$$G_M^{(0)} = \begin{cases} G & \text{when } G > G_M^{(-1)} - 0.01 \\ G_M^{(-1)} - 0.01 & \text{otherwise} \end{cases}$$

If $G < G_M - 1.0$, then the mask detection process ends and returns the detection state of the prior subframe. The mask detector excludes low energy subframes from detection.

$$d^{(0)}=d^{(-1)} \text{ when } G<G_M-1.0$$

$$M_A^{(0)}=M_A^{(-1)} \text{ when } G<G_M-1.0$$

Otherwise, the detection process continues and the spectral slope of the current subframe is computed as follows:

$$M_c = \frac{13(e_2 - e_C)}{C - 3}$$

If the spectral slope is less than 3.0, then the detection process ends and returns the detection state from the prior subframe.

$$d^{(0)}=d^{(-1)} \text{ when } M_C<3.0$$

$$M_A^{(0)}=M_A^{(-1)} \text{ when } M_C<3.0$$

The average spectral slope, $M_A$, is then computed as follows:

$$M_A^{(0)} = \begin{cases} 0.75M_A^{(-1)} + 0.25M_C & \text{if } M_C > M_A^{(-1)} + 2.0 \\ 0.875M_A^{(-1)} + 0.125M_C & \text{else if } M_C > M_A^{(-1)} + 1.0 \\ 0.96M_A^{(-1)} + 0.04M_C & \text{else if } M_C > M_A^{(-1)} + 0.5 \\ 0.98M_A^{(-1)} + 0.02M_C & \text{otherwise} \end{cases}$$

Note that this approach allows the average slope to capture abrupt increases in slope, while accounting for decreases in slope over a longer time period. This allows for earlier detection when a mask is present.

The average spectral slope is used to update the current mask detection state, $d^{(0)}$, as follows:

$$d^{(0)} = \begin{cases} 1 & \text{when } M_A > 9.5 \\ 0 & \text{otherwise} \end{cases}$$

Next, the $\log_2$ boost at 4 Khz is computed. If a mask was detected, the $\log_2$ boost is 2.0, representing a 12 dB gain at 4 kHz. Otherwise, the log boost is set to 0.0 if no mask is detected.

$$M_B=2.0\ d^{(0)}$$

As a variation of the mask detection process, the boost required to compensate for the mask can be derived from the average spectral slope in relation to a typical spectral slope. This allows the amount of boost to vary depending upon different mask characteristics. This also may allow for correction of muffling caused by something other than a mask.

Calculation of the Boost Required to Compensate for the Mask

After the mask detection process determines the appropriate boost, $M_B$, the amount of boost, B(i), to be applied to the spectrum at each DFT frequency is calculated as follows $$B(i) = \begin{cases} 0 & \text{for } 0 \le i < 24 \\ \frac{(i-24)M_B}{104} & \text{for } 24 \le i < 128 \end{cases}$$

The variable i corresponds to frequency, where i=0 represents 0 Hz and i=128 represents 4 KHz Applying the Boost Weighting Function to the Boost Filter The weighting function, w(n), was computed previously for sixteen bands. The weighting is next applied to the boost as follows:

$$\dot{B}(i) = B(i) * w\left(\left\lfloor \frac{i}{8} \right\rfloor\right)$$

Applying the Boost to the Spectrum $\dot{B}(i)$ represents the $\log_2$ boost to be applied to the spectrum, $S_m(i)$. The boosted spectrum is denoted, $\dot{S}_m(i)$, and is calculated as follows:

$$\dot{S}_m(i)=2^{2\dot{B}(i)}\cdot S_m(i)$$

Since $S_m(i)$ represents the squared magnitude, the scale factor is $2^{2B(i)}$ rather than just $2^{B(i)}$.

This is what would happen if the scale factor was applied to the real and imaginary components of the spectrum prior to squaring and summing them.

Magnitude Estimation

The magnitudes for each harmonic of the subframe are estimated by using a weighted sum of the boosted spectral energies.

$$M(l) = 0.5\log_2\left[0.001 + \sum_{k=0}^{128} w_{ME}(k, l, f)\dot{S}_m(k)\right] - 7.0$$

The spectral weighting function, $w_{ME}(k, l, f)$, is defined as $$w_{ME}(k, l, f) = \begin{cases} 1.0 & \text{if } |k - 256(l+1)f| < 128f - 0.5 \\ 0.0 & \text{if } |k - 256(l+1)f| < 128f + 0.5 \\ 128f + 0.5 - |k - 256(l+1)f| & \text{otherwise} \end{cases}$$

As can be seen in this equation, the weight at a particular frequency is 0.0 for energy that is wholly contained in another harmonic (or band). The weight is 1.0 when the energy is entirely contained within the current harmonic (or band). The weight is between 0.0 and 1.0 when the energy at a particular frequency is split between the current harmonic (or band) and an adjacent harmonic (or band).

While the techniques are described largely in the context of a MBE vocoder, the described techniques may be readily applied to other systems and/or vocoders. For example, other MBE type vocoders may also benefit from the techniques regardless of the bit rate or frame size. In addition, the techniques described may be applicable to many other speech coding systems that use a different speech model with alternative parameters (such as STC, MELP, MB-HTC, CELP, HVXC or others) or which use different methods for analysis, quantization. Other implementations are within the scope of the following claims.

What is claimed is:

1. A method of compensating a speech signal for the presence of a speaker mask, the method comprising:

receiving a speech signal representing speech of a speaker;

dividing the speech signal into subframes;

generating speech parameters for a subframe;

using the speech parameters for the subframe in determining whether the subframe is suitable for use in detecting a mask worn by the speaker;

upon determining that the subframe is suitable for use in detecting a mask, using the speech parameters for the subframe in determining whether a mask is present; and upon determining that a mask is present, modifying the speech parameters for the subframe to produce modified speech parameters that compensate the speech signal for the presence of the mask.

2. The method of claim 1, wherein the speech parameters for the subframe include a speech spectrum and spectral band energies for multiple voice bands.

3. The method of claim 2, wherein using the speech parameters for the subframe in determining whether a mask is present comprises examining a spectral slope for a subset of the voice bands.

4. The method of claim 3, wherein using the speech parameters for the subframe in determining whether a mask is present comprises examining a spectral slope for a subset of the voice bands in a frequency range from 750 Hz to 4000 Hz.

5. The method of claim 3, wherein determining whether a mask is present comprises comparing the spectral slope to a threshold value and determining that a mask is present when the spectral slope exceeds the threshold value.

6. The method of claim 2, wherein using the speech parameters for the subframe in determining whether a mask is present comprises updating an average spectral slope corresponding to multiple subframes using the speech parameters for the subframe and examining the updated average spectral slope for a subset of the voice bands.

7. The method of claim 1, wherein determining whether the subframe is suitable for use in detecting a mask comprises determining whether signal energy of the subframe exceeds a threshold value.

8. The method of claim 1, wherein modifying the speech parameters for the subframe to produce modified speech parameters that compensate for the presence of the mask comprises boosting gains in a subset of voice bands affected by the presence of a mask.

9. The method of claim 8, wherein boosting gains in a subset of voice bands affected by the presence of a mask comprises using boost levels that vary between voice bands in the subset of voice bands.

10. The method of claim 9, wherein boosting gains in a subset of voice bands affected by the presence of a mask comprises reducing boost levels for any voice bands in the subset of voice bands that do not include signal energy that exceeds noise energy by a threshold margin.

11. The method of claim 1, wherein the speech parameters comprise model parameters of a Multi-Band Excitation speech model.

12. A communications device configured to compensate a speech signal for the presence of a speaker mask, the communications device comprising:

a microphone;

a speech encoder that receives a speech signal representing speech of a speaker from the microphone and generates digital speech parameters; and a transmitter that receives the digital speech parameters from the speech encoder and transmits the digital speech parameters;

wherein the speech encoder is configured to:

divide the speech signal into subframes;

generate speech parameters for a subframe;

use the speech parameters for the subframe to determine whether the subframe is suitable for use in detecting a mask worn by the speaker;

upon determining that the subframe is suitable for use in detecting a mask, use the speech parameters for the subframe in determining whether a mask is present;

upon determining that a mask is present, modify the speech parameters for the subframe to produce modified speech parameters that compensate the speech signal for the presence of the mask; and provide the modified speech parameters to the transmitter as the digital speech parameters.

13. The communications device of claim 12, wherein the speech parameters for the subframe include a speech spectrum and spectral band energies for multiple voice bands.

14. The communications device of claim 13, wherein using the speech parameters for the subframe in determining whether a mask is present comprises examining a spectral slope for a subset of the voice bands.

15. The communications device of claim 14, wherein using the speech parameters for the subframe in determining whether a mask is present comprises examining a spectral slope for a subset of the voice bands in a frequency range from 750 Hz to 4000 Hz.

16. The communications device of claim 14, wherein determining whether a mask is present comprises comparing the spectral slope to a threshold value and determining that a mask is present when the spectral slope exceeds the threshold value.

17. The communications device of claim 13, wherein using the speech parameters for the subframe in determining whether a mask is present comprises updating an average spectral slope corresponding to multiple subframes using the speech parameters for the subframe and examining the updated average spectral slope for a subset of the voice bands.

18. The communications device of claim 12, wherein determining whether the subframe is suitable for use in detecting a mask comprises determining whether signal energy of the subframe exceeds a threshold value.

19. The communications device of claim 12, wherein determining whether the subframe is suitable for use in detecting a mask comprises determining whether signal energy of the subframe exceeds a minimum threshold value.

20. The communications device of claim 12, wherein modifying the speech parameters for the subframe to produce modified speech parameters that compensate for the presence of the mask comprises boosting gains in a subset of voice bands affected by the presence of a mask.

21. The communications device of claim 20, wherein boosting gains in a subset of voice bands affected by the presence of a mask comprises using boost levels that vary between voice bands in the subset of voice bands.

22. The communications device of claim 21, wherein boosting gains in a subset of voice bands affected by the presence of a mask comprises reducing boost levels for any voice bands in the subset of voice bands that do not include signal energy that exceeds noise energy by a threshold margin.

23. A speech encoder configured to compensate a speech signal for the presence of a speaker mask, the speech encoder being operable to:

receive a speech signal representing speech of a speaker;

divide the speech signal into subframes;

generate speech parameters for a subframe;

use the speech parameters for the subframe to determine whether the subframe is suitable for use in detecting a mask;

upon determining that the subframe is suitable for use in detecting a mask, use the speech parameters for the subframe in determining whether a mask is present; and upon determining that a mask is present, modify the speech parameters for the subframe to produce modified speech parameters that compensate the speech signal for the presence of the mask.

* * * * *